(12) United States Patent
Frenken (10) Patent No.: US 10,279,402 B2
(45) Date of Patent: May 7, 2019

(54) CUTTING DEVICE

(71) Applicant: Gustav Klauke GmbH, Remscheid (DE)

(72) Inventor: Egbert Frenken, Heinsberg (DE)

(73) Assignee: GUSTAV KLAUKE GMBH, Remscheid (DE)

( * ) Notice: Subject to any disclaimer, the term of this patent is extended or adjusted under 35 U.S.C. 154(b) by 434 days.

(21) Appl. No.: 14/406,842

(22) PCT Filed: Jun. 11, 2013

(86) PCT No.: PCT/EP2013/061965
§ 371 (c)(1),
(2) Date: Dec. 10, 2014

(87) PCT Pub. No.: WO2013/189774
PCT Pub. Date: Dec. 27, 2013

(65) Prior Publication Data
US 2015/0151367 A1    Jun. 4, 2015

(30) Foreign Application Priority Data
Jun. 21, 2012   (DE) .......... 10 2012 105 383

(51) Int. Cl.
*B23D 23/00* (2006.01)
*B23D 29/00* (2006.01)
(Continued)

(52) U.S. Cl.
CPC ............. *B23D 23/00* (2013.01); *B23D 15/04* (2013.01); *B23D 29/00* (2013.01); *B23D 29/002* (2013.01);
(Continued)

(58) Field of Classification Search
CPC ........ B23D 23/00; B23D 15/04; B23D 29/00; B23D 29/002; B23D 33/10; B23D 35/002; B23D 33/02; B23D 35/00; Y10T 83/7593
(Continued)

(56) References Cited

U.S. PATENT DOCUMENTS 1,075,439 A * 10/1913 Quinlin ................. B23D 27/02
30/241
1,834,659 A    12/1931 Teramoto
(Continued)

FOREIGN PATENT DOCUMENTS

| DE | 19926481 A1 | 12/2000 | |
|---|---|---|---|
| JP | 59064216 A * | 4/1984 | ........... B23D 29/002 |
| WO | 03/084719 A2 | 10/2003 | |

OTHER PUBLICATIONS

International Search Report and Written Opinion for PCT/EP2013/061965 dated Nov. 19, 2013, 13 pages.
(Continued)

*Primary Examiner* — Ghassem Alie
*Assistant Examiner* — Nhat Chieu Do
(74) *Attorney, Agent, or Firm* — Klintworth & Rozenblat IP LLP (57) ABSTRACT

A cutting device includes a mounting head, cutting tools and a bracing element. Each tool has a cutting edge having a recess with a substantially semi-circular contour for accommodating a portion of a workpiece. An engaging protrusion extends into each recess and has a foot circumferential angular range from 20 to 90 degrees. The engaging protrusions project into the recess by ⅕ to 9/10 of its radius. The bracing element extends from one tool and has a surface for supporting the workpiece.

15 Claims, 8 Drawing Sheets

(51) Int. Cl.
  *B23D 15/04* (2006.01)
  *B23D 33/10* (2006.01)
  *B23D 33/02* (2006.01)
  *B23D 35/00* (2006.01)

(52) U.S. Cl.
  CPC ........... *B23D 33/10* (2013.01); *B23D 35/002* (2013.01); *B23D 33/02* (2013.01); *B23D 35/00* (2013.01); *Y10T 83/7593* (2015.04)

(58) Field of Classification Search
  USPC ..................... 30/346–357, 280–314, 228
  See application file for complete search history.

(56) References Cited

U.S. PATENT DOCUMENTS

| | | | | |
|---|---|---|---|---|
| 3,624,720 A | * | 11/1971 | Laky | B21F 11/00 83/198 |
| 3,774,269 A | * | 11/1973 | Campbell | B60M 1/24 191/40 |
| 5,457,889 A | * | 10/1995 | Kimura | B23D 15/14 30/228 |
| 5,584,765 A | * | 12/1996 | Ochiai | F16C 29/0695 464/168 |
| 5,664,472 A | * | 9/1997 | Iguchi | B21F 11/00 83/216 |
| 6,230,542 B1 | * | 5/2001 | Frenken | B23D 23/00 30/228 |
| 7,254,982 B2 | | 8/2007 | Frenken | |
| 2001/0007202 A1 | * | 7/2001 | Frenken | B23D 23/00 72/416 |
| 2004/0079132 A1 | * | 4/2004 | Frenken | B21F 39/048 72/402 |
| 2004/0182189 A1 | * | 9/2004 | Frenken | F16H 1/28 74/412 R |
| 2005/0120770 A1 | * | 6/2005 | Frenken | B25B 27/10 72/453.16 |
| 2008/0302165 A1 | * | 12/2008 | Zhang | B25B 27/10 72/409.01 |
| 2012/0160065 A1 | * | 6/2012 | Frenken | B21D 22/02 81/301 |
| 2013/0042460 A1 | * | 2/2013 | Frenken | B21D 39/048 29/505 |
| 2013/0306422 A1 | | 11/2013 | White | |

OTHER PUBLICATIONS

"Fahrdraht," Wiretec Producte Consulting Partner, www.wiretec.de/dpgrc_fahrdraht.htm, 2017, 2 pages.

* cited by examiner

CUTTING DEVICE

FIELD OF THE INVENTION

The invention relates to a cutting device having a mounting head and cutting tools arranged in the mounting head so as to be movable towards each other along a cutting plane, wherein the cutting tools, one of which is fixed and the other is movable, are arranged in the mounting head so as to be removable, are offset transversely to the cutting plane and movable past each other, and form cutting edges on the frontal faces thereof that are opposite one another in the direction of travel and facing towards each other, and which are also complement each other to form a contour of a workpiece to be cut, and have recesses that form an abutment surface, wherein further a cutting tool has a bracing element that is laterally offset with respect to the cutting plane, which bracing element forms a bracing surface that is constructed to open in the opposite direction to the recess.

BACKGROUND OF THE DISCLOSURE

Cutting devices of such kind are already known in various forms. Reference is made for example to DE 19926481 A1 and/or U.S. Pat. No. 6,230,542 B1. Reference is also made to U.S. Pat. No. 5,457,889 A. For the purpose of constructing such a device regardless of the working head, further reference is made to WO 03/084719 A2 and/or U.S. Pat. No. 7,254,982 B2.

In the known cutting devices, the support element is either conformed on the displaceable tool or fixedly attached to the mounting head. Also in the known cutting device, the bracing surfaces and abutment surfaces are designed as circular segments that are unbroken in the cutting direction on circular cutting edges. Thread shapes can only be provided transversely to the cutting plane.

Moreover, it is known from the first two publications cited in the preceding to create cutting recesses in each of the cutting tools in order to handle profiled parts for cutting.

The problem arises of cutting profiled parts effectively with such a cutting device.

SUMMARY

One possible solution to the problem is realised according to a first inventive thought with a cutting device in which the bracing element is conformed on the fixed cutting tool, and both abutment surfaces are shaped with engaging projections directed towards each other, which projections encompass a foot circumferential angular range from 20 to 90 degrees relative to a contour of the abutment surfaces that is essentially semicircular and otherwise aligned in the cutting direction, and which project into the interior of the semicircle by one fifth to 9/10 of the radial dimension of the semicircular contour (the radius being based on a full circle relating thereto) and of which the foot areas that become semicircular in shape gradually evolve into a first and a second arc segment.

Also with respect to such a circumference of a workpiece to be cut that does not describe a full circular shape, a working head is described on which each of the cutting tools has one open, essentially half shape of the workpiece that is to be cut. Due to the presence of the engaging protrusions, the workpiece that is to be cut can be set square on one of the cutting tools before the actual cutting begins, and the cutting contour follows a transverse cutting contour of the workpiece to be cut to the same degree, and in this way a favourable cutting surface is obtained.

Additional features of the invention are described and illustrated in the following, and in the description of the figures and the drawing, often in a preferred association thereof with the concept described in the preceding. However, they may also be significant in an association with just one or with several individual features, which are described or presented graphically here, or independently or in another overall concept.

Accordingly, it is preferred that the circular-arc sections are of different lengths. This means that the projection may be positioned eccentrically as it were—relative to a substantially semicircular contour of an abutment surface. It is also preferred that an edge section of the engaging projection becomes a projection in the direction of travel of the movable cutting tool without an undercut into the first or second circular arc section.

Moreover, it is also preferred that the bracing surface together with the abutment surface of the fixed cutting tool yield an alignment of a straight, rod-like workpiece having a lengthwise axis that is retained in the abutment surface and the bracing surface at the same time, the outer contour and the inner contour of which workpiece match the abutment surface and the bracing surface, in which the lengthwise axis forms an acute angle with a reference plane extending perpendicularly to the cutting plane. This angle is preferably chosen such that the workpiece is inclined towards the other cutting tool, preferably the fixed cutting tool. In this way, it is advantageously possible to use the elasticity of the workpiece while cutting to exercise a corrective influence on any irregularities arising in the workpiece, particularly irregularities that cause a cutting surface not to be aligned—with respect to a lengthwise axis—at right angles to the workpiece, in such manner that the cutting surface extends almost exactly at right angles to the lengthwise axis.

For the purposes of the disclosure, the ranges defined in the preceding and in the following, particularly the angular ranges or offset ranges, but also dimensionless ranges, also include all intermediate values particularly in increments of 1/10 of a degree, firstly to delimit the identified lower and/or upper range limit, but also alternatively or in addition thereto, with a view to disclosing one or more singular values from any given range.

BRIEF DESCRIPTION OF THE DRAWINGS

In the following, the invention will be explained with reference to the accompanying drawing, in which.

DETAILED DESCRIPTION OF THE ILLUSTRATED EMBODIMENTS

A cutting device 1 with a mounting head 2 is illustrated and described. Inside mounting head 2, two cutting tools 3, 4 are arranged so as to be movable towards each other along a cutting plane 5, see FIG. 5. Cutting tool 3 is fixed in position, and cutting tool 4 is arranged movably. In further detail, cutting tool 4 is connected, in the exemplary embodiment to a hydraulic piston, which is displaced in travel direction R due to the buildup of corresponding hydraulic pressure.

Both cutting tools 3, 4 are arranged in mounting head 2 so as to be removable.

Specifically, cutting tools 3, 4 are held in place by a mounting pin 5, which engages in an undercut opening 6 of a cutting tool 3, 4. When mounting pin 5 is pressed down against a spring 26, the thinner part of the pin is positioned so as to close off the opening of said mounting section of cutting tool 3, 4 so that it can be removed.

Figure 5:
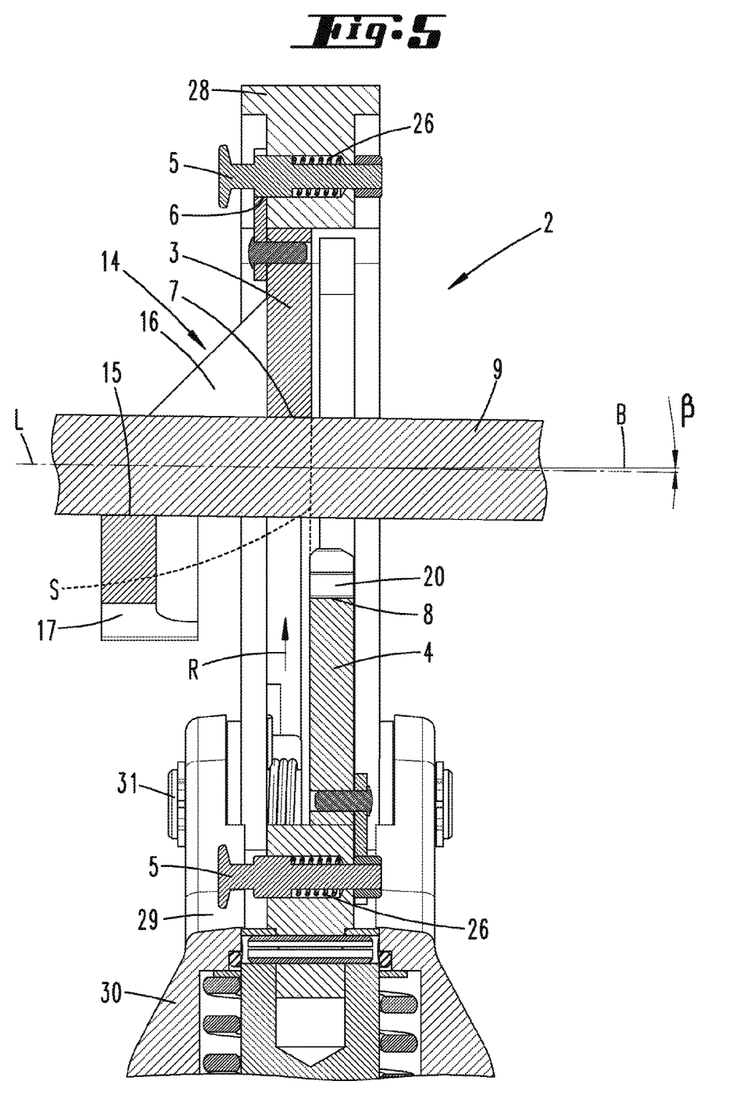
FIG. 5 is a cross section through the object of FIG. 4, bisected along plane V-V.
Figure 6:
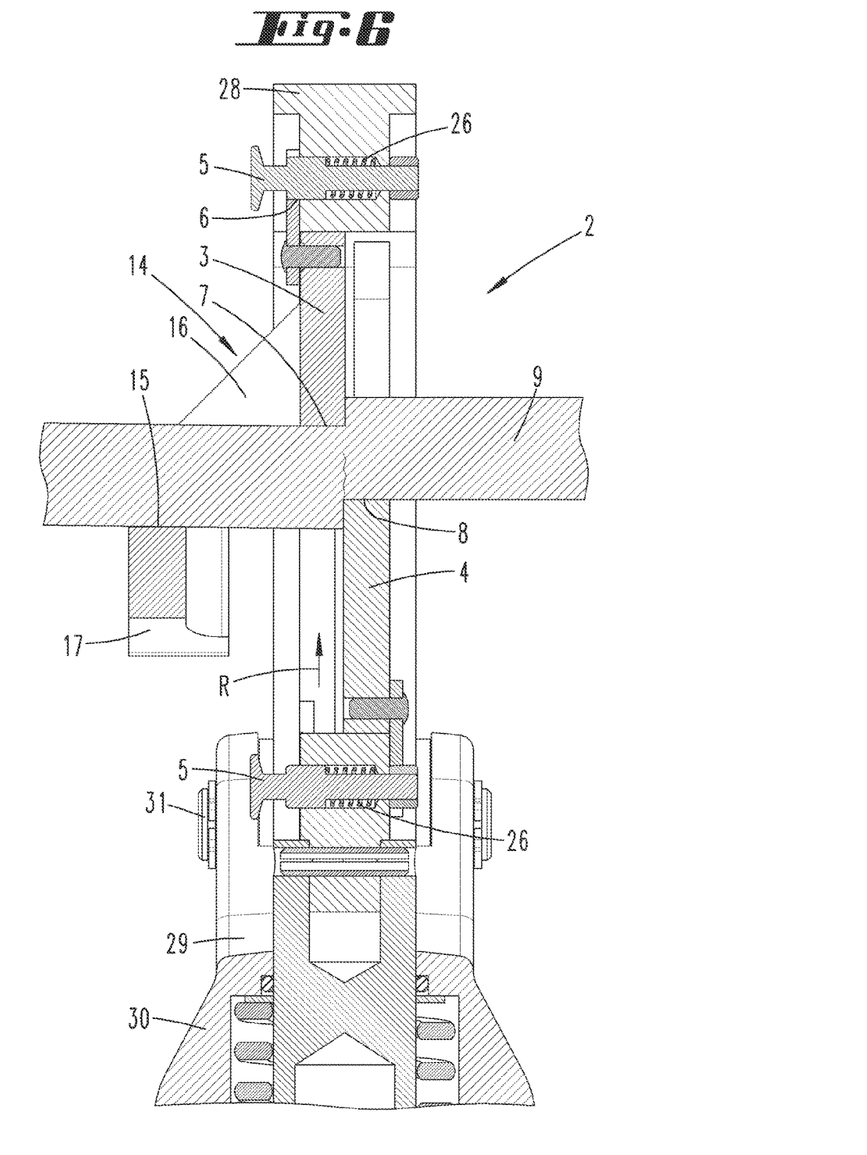
FIG. 6 shows the same view as FIG. 5 during a cutting process.

Cutting tools 3, 4 are positioned with a lateral offset in respect of each other relative to cutting plane S, as is shown in FIG. 5, in which cutting plane S is shown as a line. Thus they are able to move past each other. Movable cutting tool 4 is moved past fixed cutting tool 3 at such a distance that cutting edges 7, 8 are able to move past one another far enough to cut through a workpiece 9.

Cutting edges 7, 8 are formed on frontal surfaces 10, 11 of cutting tools 3, 4 which are facing towards each other and opposite each other in the direction of travel R. Frontal surfaces 10, 11 also form recesses 12, 13 which supplement one another to form a contour, at least substantially, of the workpiece 9 that is to be cut.

One of cutting tools 3, 4, in the embodiment and preferable the fixed position cutting tool 3, forms a bracing element 14 that is laterally further offset with respect to cutting edge 7 of said fixed position cutting tool 3. Bracing element 14 is preferably constructed integrally with and from the same material as fixed position cutting tool 3, for example by manufacturing as a cast part or a milled part.

More particularly, bracing element 14 forms a bracing surface 15 that opens in the opposite direction to the associated recess 13 of fixed position cutting tool 3.

Figure 7:
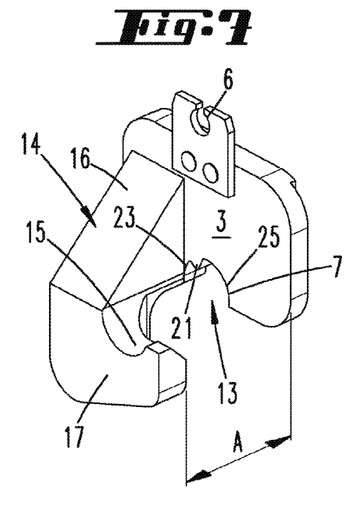
FIG. 7 shows a perspective view obliquely from the front of the fixed position cutting tool on its own.
Figure 8:
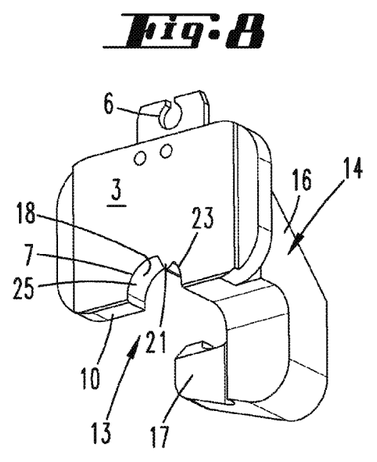
FIG. 8 shows the same view as FIG. 7, obliquely from the rear.
Figure 9:
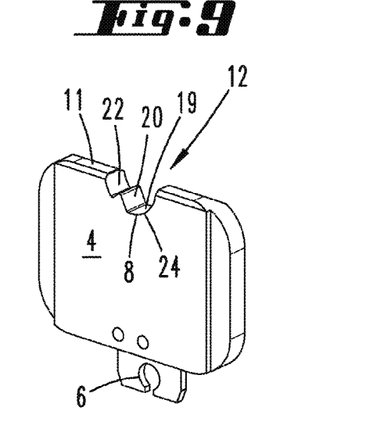
FIG. 9 shows the same view as FIG. 7 of the movable cutting tool.
Figure 10:
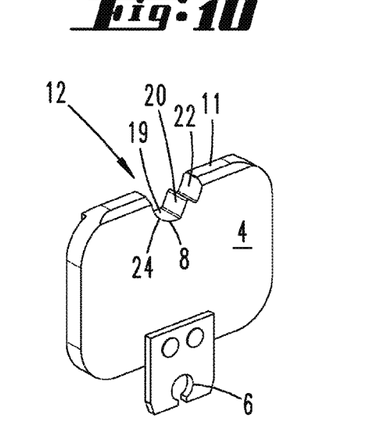
FIG. 10 shows the same view as FIG. 8 of the movable cutting tool.

More particularly, the bracing element is constructed as a bracing arm 16 that extends perpendicularly away from a side face F that is aligned substantially parallel to cutting plane S, and the end of which is reshaped to form a hooked cantilever arm 17. From one perspective, cantilever arm 17 extends in a cutting direction perpendicularly to support arm 16. Cantilever arm 17 extends further with a lateral clearance from said side face F of fixed position cutting tool 3. As may be seen in FIG. 7, for example, clearance A is greater than a diameter of a circle that is generally defined in the circular sectional areas by bracing surface 15 and abutment surface 18, and which forms recess 13. The size thereof may be as much as two or three times larger than such a circle.

Abutment surface 18, which is formed by recess 13, and abutment surface 19, which is formed by recess 12, each have an engaging projection 20 or 21, whereas together the abutment surfaces 18, 19 otherwise have a substantially semicircular contour.

Otherwise, the foot region of engaging projections 20 or 21, at the point where it assumes the semicircular contour, has a circumferential angle range α from 20 to 90 degrees relative to a radius r of a circular segment shaped area of abutment surface 17 or 18. The engaging protrusion is directed inwards relative to the semicircle or relative to the full circle formed by the two abutment surfaces when they are moved together and in projection. Dimension m, designating the distance to which the engaging protrusion penetrates the interior, is equal to one-fifth up to 9/10 of radius r of the semicircular contour. In this context, dimension m is measured from the radial tip of the engaging protrusion to the circumferential line, if it is projected starting from the facing sections of the circular arc. Laterally, in the circumferential direction of the respective semi-circular contour, a first circular arc section 22 or 23 and a second circular arc section 24 or 25 are adjacent to engaging protrusion 20 or 21.

Said circular arc sections 22 and 24 or 23 and 25 are of different lengths. The second circular arc section is preferably one-third or more, and may be as much as three or four times larger than the first circular arc section. Regarding cutting tools 3 and 4, the first circular arc sections and the second circular arc sections are constructed such that they are directly opposite each other.

Together with the abutment surface of fixed position cutting tool 3, bracing surface 15 is orientated in such manner that an alignment of a workpiece 9 held simultaneously in the abutment surface and the bracing surface is obtained, and an acute angle β from 0.2 to 2 degrees is formed relative to lengthwise axis L of the workpiece and a reference plane B extending perpendicularly to cutting plane S, as may be seen in FIG. 5. Acute angle β is inclined towards movable cutting tool 4 starting from reference plane B.

Workpiece 9 is shown as a straight, rod-shaped, workpiece. The outer contour thereof corresponds to an inner contour of the abutment surface and the bracing surface.

As was noted previously, the movable cutting tool may be actuated via a hydraulic piston. More particularly, the design of the cutting tool may be envisaged to this extent according to the cited documents WO 03/084719 A2 and U.S. Pat. No. 7,254,982 B2 with regard to actuation, particularly the design relating to the hydraulic drive, the transmission, the actuating buttons, the electric motor and the battery, and the placement thereof inside the device, as described in the cited documents, are herewith included in their entirety in the disclosure of the present application, also for the purpose of incorporating features of said cited documents in the claims of the present application.

Figure 1:
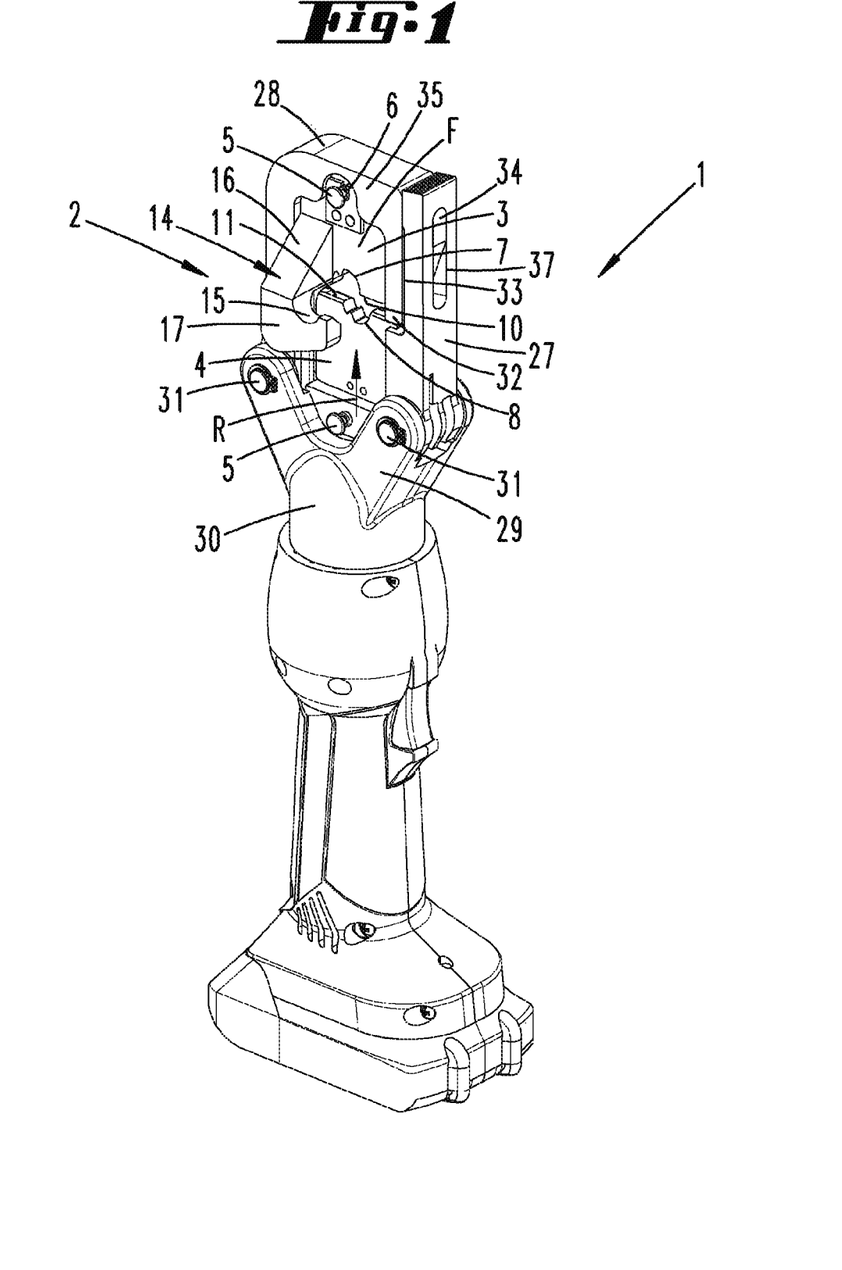
FIG. 1 shows a perspective view of a cutting device.
Figure 1A:
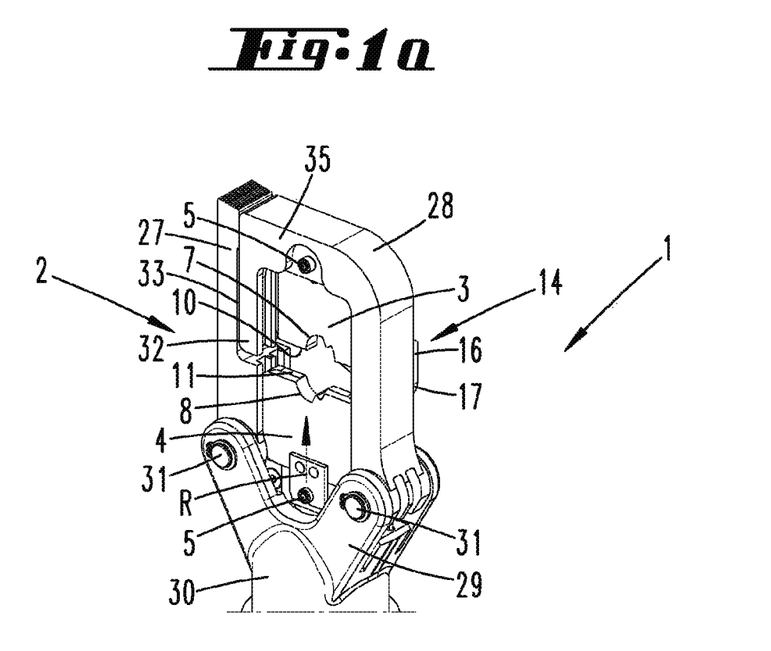
FIG. 1a is a rear view of FIG. 1.
Figure 2:
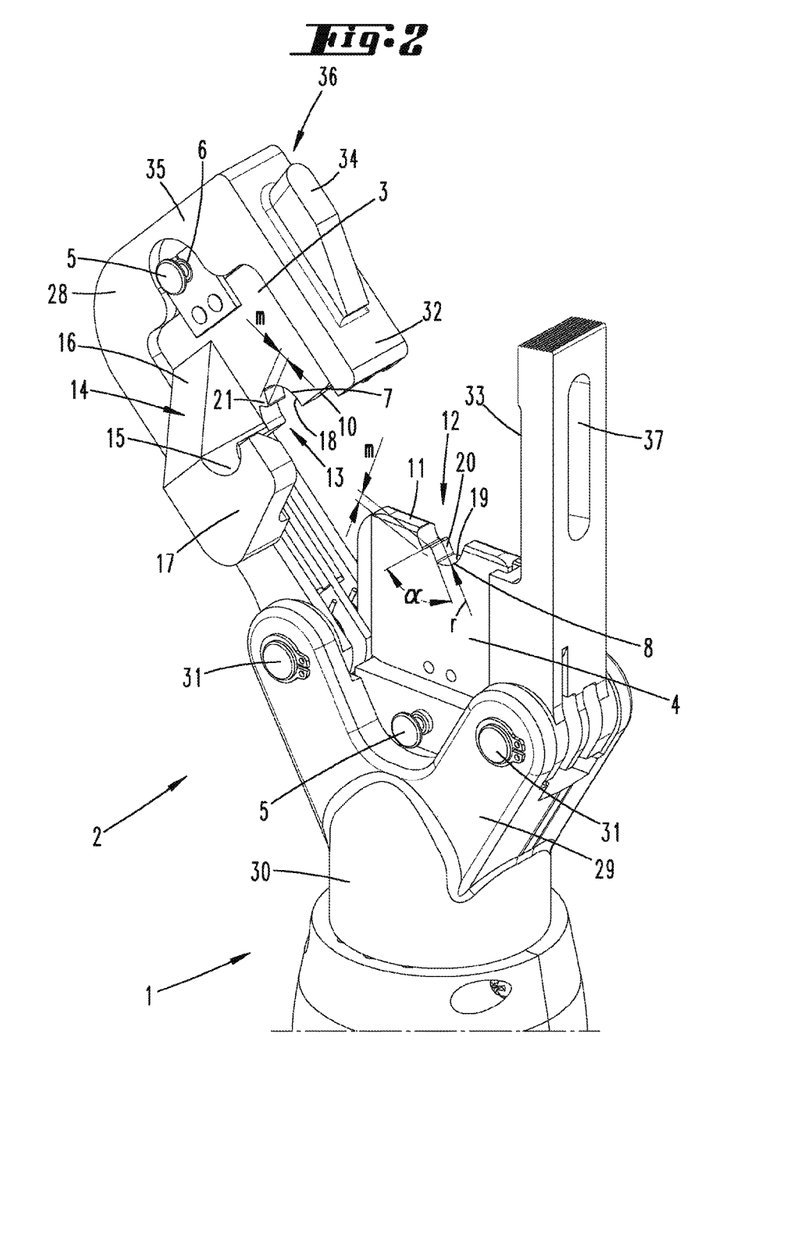
FIG. 2 shows the working head of the cutting device of FIG. 1, in the opened position.
Figure 3:
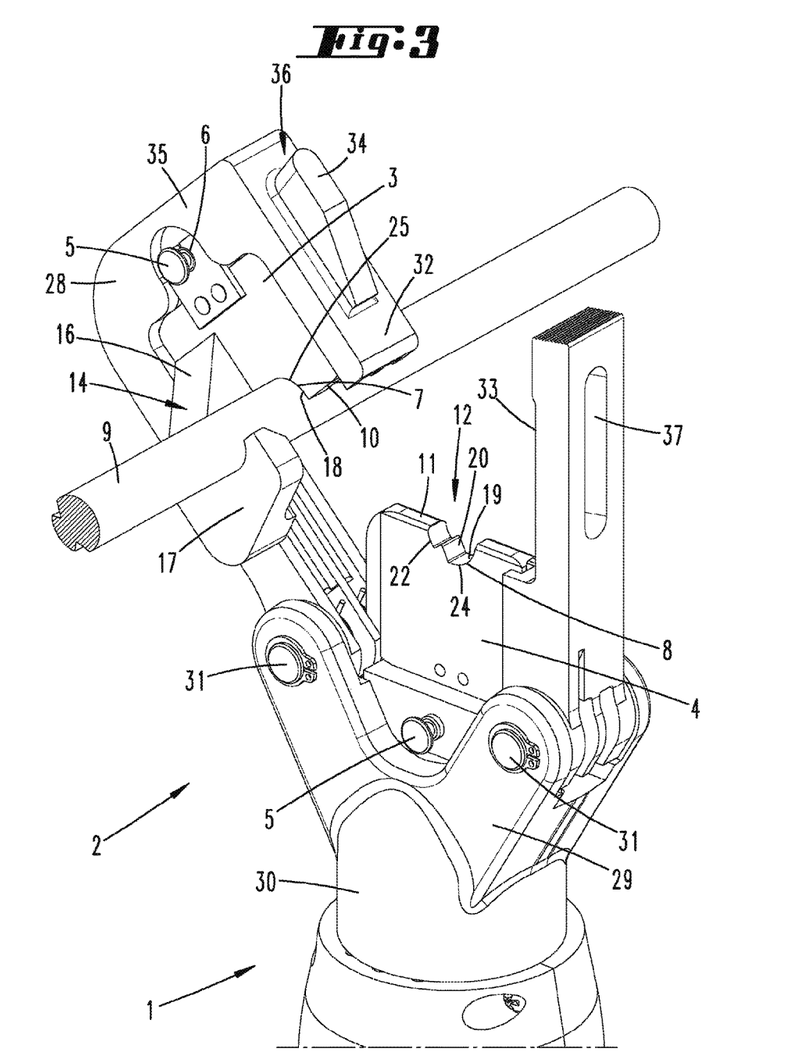
FIG. 3 shows the same view as FIG. 2 with a workpiece inserted in the fixed position cutting tool.

Regarding the working head, more particularly mounting head 2 is constructed with the rectangular guide for the cutting tools described earlier. In this context, it is further preferred to provide a long side section 27 with a width measured transversely to the extension direction of the rectangular guide, i.e., transversely to the direction of movement of the movable cutting tool, which is equal to that of angle section 28, in conjunction with which the long side section forms the rectangular guide. The third part of the rectangular guide has the form of a second, short side section 29, wherein in the actual embodiment shown, two short side sections are provided with an offset therebetween in a direction perpendicular to the direction of movement of movable cutting body. These are connected to one another via a flange 30 with a preferably circular cross-section to enable the mounting head to be attached to the neck of the body unit, as indicated in FIG. 2.

Both the long side section 27 and the angle section 28 are mounted in swiveling manner in the intermediate space formed between short side sections 29.

For this purpose, both the short side sections 29 as well as a part of the long side section 27 and the free end of the longer U-leg of the angle section 28 are each traversed by pins 31, which are secured against falling out by retaining rings visible on the outer wall side of short side sections 29.

Figure 4:
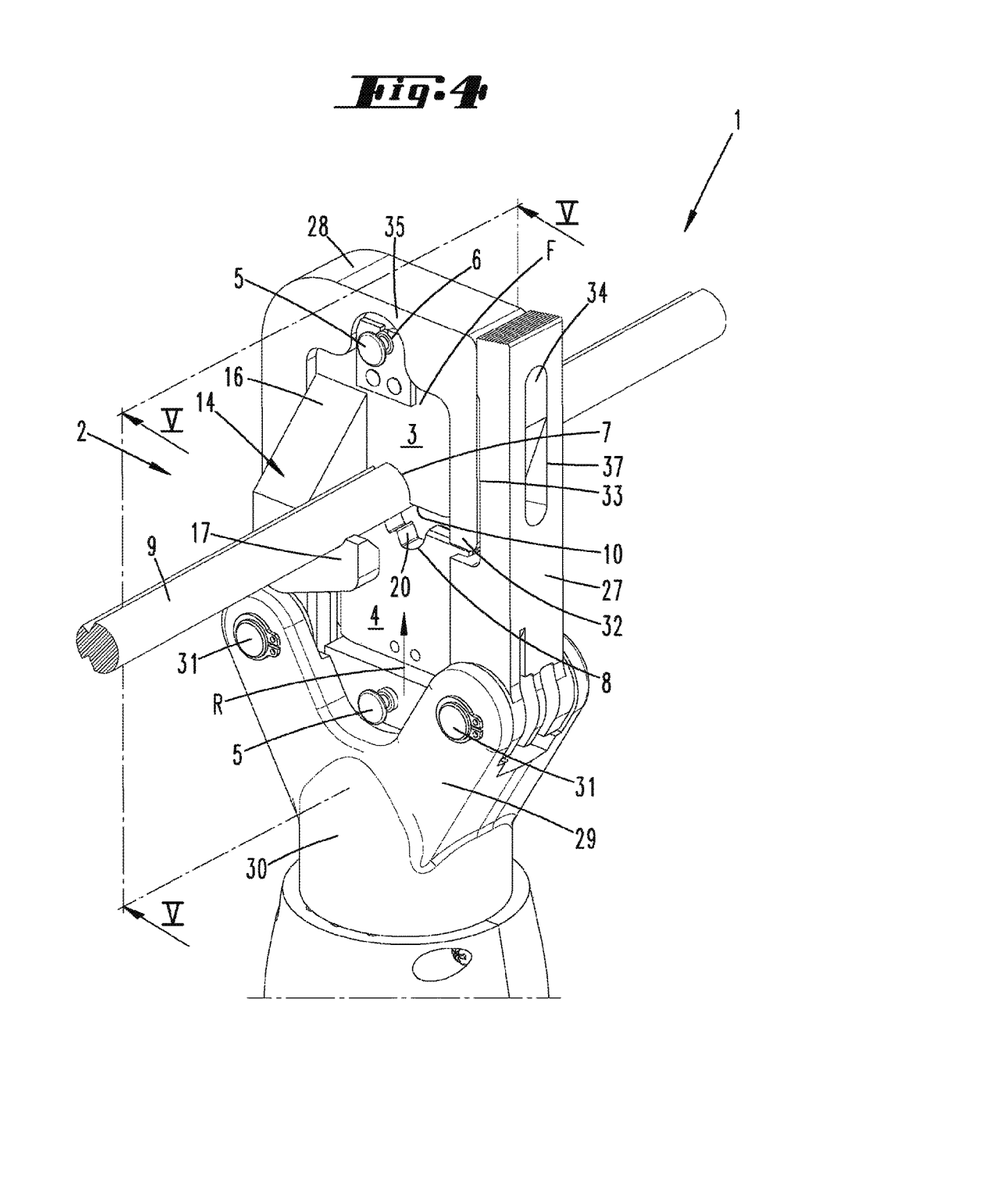
FIG. 4 shows the working head of FIG. 2 or FIG. 3 in the closed position.

The long side section 27 of the rectangular guide can be brought to overlap long side subsection 32 of angle section 28, for which purpose the latter has a dimension (thickness) equal to approximately half the thickness of the long side section 27 in the hinge area thereof. Long side section 27 has a gap 33 with open front face matching long side subsection 32, which is slightly longer than the length of long side subsection 32. Long side subsection 32 can be fully accommodated in gap 33 to form a side section that is uniformly thick and wide (see also FIG. 4).

In order to fix angle section 28 and the long side subsection 32 thereof on long side section 27, the upper side of long side subsection 32 is furnished with an elongated projection 34, of which the leading, front face area 36 closest to the short side subsection 35 of angle section 28, has an undercut, which is not visible in detail in the drawing due to the minimal inclination of front face area 36. Said projection 34 engages in a correspondingly shaped and aligned longitudinal slot 37 with a corresponding undercut end zone to create a locked condition. In this way, in the closed position shown in FIG. 4, angle section 28 is retained in positive locking manner in the longitudinal slot 37 of long side section 27 via the projection 34 thereof, so that the mounting head can only be opened intentionally.

For further details, reference is also made to DE 19926481 A1 cited in the introduction and U.S. Pat. No. 6,230,542 B1. The details of the rectangular guide described there are also realized by the subject matter of the present application, with the exception of the special design of the cutting tools. These details are herewith also included in the disclosure of the present application in their entirety, also for the purpose of incorporating features from said cited documents in claims of the present application.

The cutting device described here is especially designed to cut "catenary wires". Catenary wires are rod-shaped, electrical conducting elements that are used on tram and rail systems, particularly in the overhead cables.

All features disclosed are (individually) essential to the invention. The contents of the disclosure of the associated/attached priority documents (copy of the prior application) are herewith also included in full in the disclosure of the application, also for the purpose of incorporating features of these documents in claims of the present application. In the optionally coordinate version, the dependent claims characterise refinements of the prior art that are inventive on their own merits, particular in order to submit divisional applications based on said claims.

List of reference signs:

| | |
|---|---|
| 1 | Cutting device |
| 2 | Mounting head |
| 3 | Cutting tool |
| 4 | Cutting tool |
| 5 | Mounting pin |
| 6 | Undercut, undercut opening |
| 7 | Cutting edge |
| 8 | Cutting edge |
| 9 | Workpiece |
| 10 | Frontal surface |
| 11 | Frontal surface |
| 12 | Recess |
| 13 | Recess |
| 14 | Bracing element |
| 15 | Bracing surface |
| 16 | Bracing arm |
| 17 | Cantilever arm |
| 18 | Abutment surface |
| 19 | Abutment surface |
| 20 | Engaging protrusion |
| 21 | Engaging protrusion |
| 22 | First circular arc section |
| 23 | First circular arc section |
| 24 | Second circular arc section |
| 25 | Second circular arc section |
| 26 | Spring |
| 27 | Long side section |
| 28 | Angle section |
| 29 | Short side section |
| 30 | Flange |
| 31 | Bolt |
| 32 | Long side subsection |
| 33 | Gap |
| 34 | Projection |
| 35 | Short side subsection |
| 36 | Front face area |
| 37 | Bearing slot |
| A | Clearance |
| B | Reference plane |
| F | Side face |
| R | Direction of travel |
| S | Cutting plane |
| m | Dimension |
| r | Radius |
| α | Circumferential angle |
| β | Angle |

The invention claimed is:

1. A cutting device configured to cut a workpiece, comprising:

a mounting head having a first guide and a second guide, the second guide being pivotally mounted to the first guide;

a first cutting tool fixedly mounted to the first guide, a second cutting tool movably mounted on the second guide and linearly movable toward the first cutting tool when the second guide is pivoted relative to the first guide such that the first and second cutting tools are linearly aligned, the first and second cutting tools being removable from the mounting head, the first and second cutting tools are offset transversely relative to a cutting plane defined by the mounting head, the second cutting tool being movable past a portion of the first cutting tool, each of the cutting tools having a frontal face on which a cutting edge is provided, the cutting edges facing toward each other, each of the cutting edges having a recess forming an abutment surface having a substantially semi-circular contour which defines a radius;

each of the first and second cutting tools further having an engaging protrusion extending from the respective abutment surfaces and dividing the respective abutment surfaces into first and second arc segments, each of the engaging protrusions extending toward each other when the second guide is pivoted relative to the first guide such that the first and second cutting tools are linearly aligned, each of the engaging protrusions having a foot circumferential angular range from 20 to 90 degrees relative to the substantially semi-circular contour of the respective abutment surface, each of the engaging protrusions project into an interior of the semi-circular contour of the respective abutment surface by ⅕ to 9/10 of the radius thereof, wherein the arc segments fall along an imaginary line forming a full circle when the abutment surfaces are moved together and are in projection, each arc segment is defined by the same radius defined from a centerpoint of the imaginary line forming the full circle; and a bracing element extending from the first guide, the bracing element having a portion being laterally offset from the cutting plane, the portion forming a bracing surface which opens in an opposite direction to which the recess in the first cutting tool opens, the bracing surface having a semi-circular contour, the engaging protrusion of the first cutting tool being aligned with the bracing surface in an alignment plane, the alignment plane being perpendicular to the cutting plane, wherein the bracing surface and the abutment surface of the first cutting tool provide for alignment and support of the workpiece prior to pivoting of the second guide relative to the first guide and provide for alignment and support of the workpiece during cutting of the workpiece.

2. The cutting device of claim 1, wherein the arc segments on the first cutting tool are of different lengths.

3. The cutting device of claim 2 in combination with a straight workpiece, wherein the workpiece has a lengthwise axis that is simultaneously retained in the abutment surface and the bracing surface, the workpiece having an outer contour which conforms to the abutment surface and substantially conforms to the bracing surface, the lengthwise axis forming an acute angle with a reference plane that extends perpendicularly to the cutting plane.

4. The cutting device of claim 3, wherein the arc segments on the second cutting tool are of different lengths.

5. The cutting device of claim 4 in combination with a straight workpiece, wherein the workpiece has a lengthwise axis that is simultaneously retained in the abutment surface and the bracing surface, the workpiece having an outer contour which conforms to the abutment surface and substantially conforms to the bracing surface, the lengthwise axis forming an acute angle with a reference plane that extends perpendicularly to the cutting plane.

6. The cutting device of claim 5, wherein the first arc segments are of a different length than the second arc segments.

7. The cutting device of claim 6 in combination with a straight workpiece, wherein the workpiece has a lengthwise axis that is simultaneously retained in the abutment surface and the bracing surface, the workpiece having an outer contour which conforms to the abutment surface and substantially conforms to the bracing surface, the lengthwise axis forming an acute angle with a reference plane that extends perpendicularly to the cutting plane.

8. The cutting device of claim 1, wherein each engaging protrusion comprises a first planar surface extending from the first arc segment and a second planar surface extending from the first arc segment, the planar surfaces meeting at a tip.

9. The cutting device of claim 1,
wherein the bracing element further comprises an arm extending outwardly from the first guide and the portion extends from the arm,
wherein each first arc segment has a first length and each second arc segment has a second length, the first length being less than the second length, and wherein the first arc segment on the first cutting tool is proximate to the arm and the second arc segment on the first cutting tool is spaced from the arm such that the first arc segment on the first cutting tool is between the second arc segment on the first cutting tool and the arm.

10. A combination comprising:
a cutting device comprising
a mounting head having a first guide and a second guide, the second guide being pivotally mounted to the first guide,
a first cutting tool fixedly mounted to the first guide, a second cutting tool movably mounted on the second guide and linearly movable toward the first cutting tool when the second guide is pivoted relative to the first guide such that the first and second cutting tools are linearly aligned, the first and second cutting tools being removable from the mounting head, the first and second cutting tools are offset transversely relative to a cutting plane defined by the mounting head, the second cutting tool being movable past a portion of the first cutting tool,
each of the cutting tools having a frontal face on which a cutting edge is provided, the cutting edges facing toward each other, each of the cutting edges having a recess forming an abutment surface having a substantially semi-circular contour which defines a radius,
each of the first and second cutting tools having an engaging protrusion extending from the respective abutment surfaces and dividing the respective abutment surfaces into first and second arc segments, each of the engaging protrusions extending toward each other when the second guide is pivoted relative to the first guide such that the first and second cutting tools are linearly aligned, each of the engaging protrusions having a foot circumferential angular range from 20 to 90 degrees relative to the substantially semi-circular contour of the respective abutment surface, each of the engaging protrusions project into an interior of the semi-circular contour of the respective abutment surface by ⅕ to 9/10 of the radius thereof, and
a bracing element extending from the first guide, the bracing element having a portion being laterally offset from the cutting plane, the portion forming a bracing surface which opens in an opposite direction to which the recess in the first cutting tool opens, the bracing surface having a semi-circular contour, the engaging protrusion of the first cutting tool being aligned with the bracing surface in an alignment plane, the alignment plane being perpendicular to the cutting plane; and
a straight workpiece having a lengthwise axis that is simultaneously retained in the abutment surface and the bracing surface, the workpiece having an outer contour which conforms to the abutment surface and substantially conforms to the bracing surface, the lengthwise axis forming an acute angle with a reference plane that extends perpendicularly to the cutting plane during cutting,
wherein the bracing surface and the abutment surface of the first cutting tool provide for alignment and support of the workpiece prior to pivoting of the second guide relative to the first guide and provide for alignment and support of the workpiece during cutting of the workpiece.

11. The combination of claim 10, wherein the first arc segments are of a different length than the second arc segments.

12. The combination of claim 10,
wherein the bracing element further comprises an arm extending outwardly from the first guide and the portion extends from the arm,
wherein each first arc segment has a first length and each second arc segment has a second length, the first length being less than the second length, and wherein the first arc segment on the first cutting tool is proximate to the arm and the second arc segment on the first cutting tool is spaced from the arm such that the first arc segment on the first cutting tool is between the second arc segment on the first cutting tool and the arm.

13. A cutting device for use with a straight workpiece, comprising:
a mounting head having a first guide and a second guide, the second guide being pivotally mounted to the first guide;
a first cutting tool fixedly mounted to the first guide, a second cutting tool movably mounted on the second guide and linearly movable toward the first cutting tool when the second guide is pivoted relative to the first guide such that the first and second cutting tools are linearly aligned, the first and second cutting tools being removable from the mounting head, the first and second cutting tools are offset transversely relative to a cutting plane defined by the mounting head, the second cutting tool being movable past a portion of the first cutting tool, each of the cutting tools having a frontal face on which a cutting edge is provided, the cutting edges facing toward each other, each of the cutting edges having a recess forming an abutment surface, each of the first and second cutting tools having an engaging protrusion extending from the respective abutment surfaces and dividing the respective abutment surfaces into first and second arc segments, each of the engaging protrusions extending toward each other when the second guide is pivoted relative to the first guide such that the first and second cutting tools are linearly aligned; and
a bracing element extending from the first guide, the bracing element having a portion being laterally offset from the cutting plane, the bracing element forming a bracing surface which opens in an opposite direction to which the recess in the first cutting tool opens, the bracing surface having a semi-circular contour, the workpiece having a lengthwise axis that is simultaneously retained in the abutment surface and the bracing surface, the workpiece having an outer contour which conforms to the abutment surface and substantially conforms to the bracing surface, the lengthwise axis forms an acute angle with a reference plane that extends perpendicularly to the cutting plane during cutting, the engaging protrusion of the first cutting tool being aligned with the bracing surface in an alignment plane, the alignment plane being perpendicular to the cutting plane,
wherein the bracing surface and the abutment surface of the first cutting tool provide for alignment and support of the workpiece prior to pivoting of the second guide relative to the first guide and provide for alignment and support of the workpiece during cutting of the workpiece.

14. The cutting device of claim 13, wherein the bracing element extends from the first cutting tool.

15. The cutting device of claim 13,
wherein the bracing element further comprises an arm extending outwardly from the first guide and the portion extends from the arm,
wherein each first arc segment has a first length and each second arc segment has a second length, the first length being less than the second length, and wherein the first arc segment on the first cutting tool is proximate to the arm and the second arc segment on the first cutting tool is spaced from the arm such that the first arc segment on the first cutting tool is between the second arc segment on the first cutting tool and the arm.

* * * * *